United States Patent Office 2,718,509
Patented Sept. 20, 1955

2,718,509

PLASTICIZED RESIN COMPOSITIONS

Lester G. Lundsted and John P. McMahon, Grosse Ile, Mich., assignors to Wyandotte Chemicals Corporation, Wyandotte, Mich., a corporation of Michigan No Drawing. Application January 14, 1954,
Serial No. 404,134

3 Claims. (Cl. 260—33.2)

This invention relates to plasticized resin compositions. More particularly, this invention relates to resin compositions which contain therein epoxyhydrocarbon polymer plasticizers which contain in their structure at least 15% of an oxyalkylene group containing three or more carbon atoms, and which are characterized by having desirable physical properties such as transparency, resiliency and flexibility.

Resin compositions are well known in the art and have experienced a tremendous growth in the past two decades. These compositions have desirable properties which make them eminently suitable for use in such diverse arts as surface coatings, synthetic textiles, molded goods, synthetic elastomers, films, etc. To obtain optimum properties in such resin compositions, it is often desirable to incorporate plasticizers therein.

Within the art, all resin compositions are divided into two broad types, viz. thermoplastic or thermosetting. Thermoplastic resings, after being polymerized, can be molded and deformed under heat and pressure and are easily plasticized with high boiling organic esters. While such ester plasticized thermoplastic resin compositions are very useful, they have several serious shortcomings. For example, the esters employed often "bleed" and/or "migrate" from the composition and are difficult to incorporate in the resin. Furthermore, in spite of their relatively low vapor pressures, the esters slowly evaporate from the plasticized composition. In contrast to the thermoplastic resin compositions, plasticizers are seldom if ever used with thermosetting resins. Although it has been realized that plasticizers would widen the field of utility of thermosetting resins by increasing their flexibility, it has not been possible to prepare such plasticized resin compositions because efficient plasticizers have not been heretofore available for such thermosetting resins.

It is an object of this invention to provide plasticized resin compositions having improved physical properties.

Another object of this invention is to provide resin compositions which contain therein epoxyhydrocarbon polymers which serve as plasticizers therefor.

An additional object of this invention is to provide resin compositions which contain therein epoxyhydrocarbon polymers which contain in their structure at least 15% of an oxyalkylene group containing three or more carbon atoms and which serve as plasticizers therefor.

Other objects and advantages of this invention will become apparent from the following detailed description thereof.

It has been discovered that epoxyhydrocarbon polymers, which contain in their structure at least 15% by weight of a higher oxyalkylene group containing three or more carbon atoms, are compatible with both thermoplastic and thermosetting resins and are efficient plasticizers therefor. The epoxyhydrocarbon polymer components of the plasticized resin compositions of this invention are characterized by having recurring oxyalkylene groups of the type:

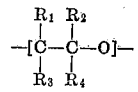

wherein: $R_1$, $R_2$, $R_3$ and $R_4$ are hydrogen or hydrocarbon radicals in their molecular structure, at least 15% by weight of such oxyalkylene groups containing three or more carbon atoms. The preferred epoxyhydrocarbon polymers that are used in this invention have molecular weights of at least 250 and optimum properties are obtained with compounds having molecular weights in excess of 500. As used in the present application, the term "epoxyhydrocarbon polymer" includes polyoxyalkylene glycols and monosubstituted derivatives thereof such as are prepared by condensing 1,2 alkylene oxides with organic compounds containing a single active hydrogen atom. Examples of such epoxyhydrocarbon polymers include polyoxypropylene glycols, polyoxybutylene glycols, "heteric" polyoxyethylene-polyoxypropylene glycols such as described in U. S. Patent No. 2,425,845 in which the oxyethylene and oxypropylene groups are randomly distributed through the chain, alkyl ethers of "heteric" polyoxyethylene-polyoxypropylene glycols such as described in U. S. Patent No. 2,425,755, and alkyl ethers of polyoxypropylene glycols such as described in U. S. Patent No. 2,448,664. Exceptionally good results are obtained with the conjugated polyoxyethylene-polyoxypropylene glycols of the type described in the copending application of Lester G. Lundsted, Serial No. 386,945, now U. S. Patent 2,674,619 which have the following type formula:

(A)

$HO(C_2H_4O)_x$-polyoxypropylene polymer-$(C_2H_4O)_{x'}H$ wherein:

the polyoxypropylene polymer has an average molecular weight of at least 250 and the weight of the radicals $(C_2H_4O)_x$ and $(C_2H_4O)_{x'}$ constitutes at least 20% of the total weight of the compound and the monosubstituted derivatives of the conjugated polyoxyethylene-polyoxypropylene glycols of the type described in the copending application of Donald R. Jackson and Lester G. Lundsted, Serial No. 229,128 filed May 31, 1951 now Patent Number 2,677,700, which have the following type formula:

(B)        $R-(C_3H_6O)_x(C_2H_4O)_yH$ wherein:

R is the residue of an organic compound containing therein a single hydrogen atom capable of reacting with a 1,2 alkylene oxide, $x$ is at least 3, and $y$ has a value such that the weight of the $(C_3H_6O)$ groups constitutes at least 15% by weight of the compound.

In either Formula A or B oxyalkylene groups containing four or more carbon atoms, such as, oxybutylene groups, oxycyclohexene groups, oxystyrene groups, etc., may be substituted for the oxypropylene groups shown.

The methods employed to prepare the resin compositions and the epoxyhydrocarbon polymer plasticizers used in the present invention are completely disclosed in the references above cited as well as other prior art so that they need not be set forth herein in detail. Illustrative methods of preparation of these compositions will be set forth, however, in the examples where required for clarity.

The epoxyhydrocarbon polymer plasticizers may be incorporated in the resin compositions by conventional methods that will differ somewhat for each resin plasticizer combination, but which are well known to those skilled in the art. Intimate mixtures of liquid plasticizers and liquid resins may be effected by simply adding the plasticizer to the resin with stirring. Intimate dispersions of solid plasticizers and solid resins are conveniently obtained by simply mixing the two components in a ball mill. Either liquid or solid plasticizers may be incorporated into the resins by means of two roll differential speed rubber mills, Banbury mixers and other similar plastic mixing equipment.

The following examples are set forth to illustrate the principle in practice of this invention to those skilled in the art:

EXAMPLE 1

A polyoxypropylene glycol having a molecular weight of 1800 was prepared by condensing 1,2 propylene oxide with propylene glycol in the presence of a caustic catalyst at about 150° C. in a sealed autoclave.

EXAMPLE 2

A "heteric" polyoxyethylene-polyoxypropylene glycol of the type described in U. S. 2,425,845 containing 55% propylene groups and 45% oxyethylene groups and having a total molecular weight of 2000 was prepared by condensing a mixture of 45% ethylene oxide and 55% 1,2 propylene oxide with a mixture of ethylene and propylene glycols as described in Example 1.

EXAMPLES 3–5

Three conjugated polyoxyethylene-polyoxypropylene glycols, having structures conforming to formula A, previously set forth, were prepared by condensing ethylene oxide with the polyoxypropylene glycol of Example 1. The composition of the compounds are set forth in Table I, below:

Table I

| Example | Molecular Weight Polyoxypropylene | Weight Percent Oxyethylene Groups in Molecule |
| --- | --- | --- |
| 3 | 1,800 | 28 |
| 4 | 1,800 | 40 |
| 5 | 1,800 | 80 |

The products of Examples 3 and 4 were viscous liquids, whereas the product of Example 5 was a wax-like solid which softened at about 45° C. and melted at about 50° C.

EXAMPLE 6

A conjugated polyoxyethylene-polyoxypropylene glycol corresponding to the products of Examples 3–5, inclusive, was prepared by condensing sufficient ethylene oxide with a polyoxypropylene glycol of 1200 molecular weight to obtain a product which contained 40% oxyethylene groups.

EXAMPLE 7

1,2 propylene oxide was condensed with benzenesulfonamide to prepare a polyoxypropylene polymer having a molecular weight of 370. Sufficient ethylene oxide was condensed therewith to prepare a conjugated oxyethylene-oxypropylene epoxyhydrocarbon polymer in which the oxyethylene groups constituted 64% by weight of the final compound.

EXAMPLE 8

1,2 propylene oxide was condensed with phenol to prepare a phenyl ether of a polyoxypropylene glycol in which the molecular weight of the ether was 295. Ethylene oxide was subsequently condensed therewith to prepare a conjugated oxyethylene-oxypropylene epoxyhydrocarbon polymer in which the oxyethylene groups constituted 71% by weight of the resulting compound.

EXAMPLE 9

A compound corresponding to that of Example 8 was prepared by condensing phenol with 1,2 propylene oxide to prepare a phenyl ether of a polyoxypropylene glycol in which the molecular weight of the ether was 424. Sufficient ethylene oxide was condensed therewith to prepare a conjugated oxyethylene-oxypropylene epoxyhydrocarbon polymer in the oxyethylene groups constituted 74% by weight of final compound.

EXAMPLE 10

Part A

Into a one-liter three-neck round-bottom flask equipped with a thermometer, reflux condenser and stirrer were charged 94 grams (1 mol) of phenol, 200 grams of a 37.2% formalin (2.5 mols of formaldehyde) and 1.5 grams of KOH. The reaction mixture was refluxed for 1.5 hours and was then neutralized to a pH of 6 with a 10% aqueous solution of lactic acid. The reaction mixture was dehydrated by heating under a vacuum of 15 mm. of mercury until the pot temperature reached 70° C. to obtain a viscous syrup.

Part B

Evaluations were made of resin compositions comprising the phenol formaldehyde resin of Part A and the epoxyhydrocarbon polymers of Examples 3, 4, 5 and 6. Each epoxyhydrocarbon polymer was added to the phenol formaldehyde resin to prepare compositions containing from 10 to 70% epoxyhydrocarbon polymer in increments of 10%. The resin and plasticizer were mixed by weighing the desired quantity of the two components into a small beaker and stirring with a glass rod while heating the beaker on a steam bath. The plasticized resins were cured by heating for 5 days at 85° C. in 11 inch sections of 8 mm. glass tubing that were sealed at one end.

The rods composed of pure resin were opaque, rigid and brittle, whereas those composed of resin compositions containing from 20–40% by weight of epoxyhydrocarbon polymer had excellent plastic properties, combining good flexibility with toughness, resiliency and a smooth transparent appearance. The resin compositions comprising 10–20% of epoxyhydrocarbon polymer were clear and transparent, but slightly brittle, while those containing over 40% plasticizer were clear and very flexible, but had less resiliency and lower tensile strengths than the compositions containing 20–40% epoxyhydrocarbon polymer.

An interesting feature of these compositions is that when the plasticized rods were rubbed with fur they did not develop a static charge, whereas the unplasticized rod developed a strong charge. This property suggests that these plasticized compositions will be valuable for many specialized applications in the electrical and mechanical arts.

EXAMPLE 11

The epoxyhydrocarbon polymer of Example 7 was incorporated in the phenol formaldehyde resin of Example 10, Part A to the extent of 10–70% in increments of 10% and the resulting plasticized resin compositions were evaluated as described in Example 10, Part B. The resulting compositions had excellent physical properties combining good flexibility with toughness and resiliency. The compositions were particularly outstanding and surpassed the results obtained in Example 10, Part B in that the plasticized resin compositions had higher tensile strengths in combination with good flexibility and resiliency.

EXAMPLE 12

The heteric polyoxyethylene-polyoxypropylene glycol of Example 2 was incorporated into the phenol formaldehyde resin of Example 10, Part A to the extent of 20 and 40% and rods were made therefrom as described in Example 10, Part B. The composition containing 20% of the epoxyhydrocarbon polymer had good plastic properties, but was somewhat opaque. The product containing 40% of the epoxyhydrocarbon polymer had greater resiliency and flexibility and was clear and transparent.

EXAMPLE 13

The polyoxypropylene glycol of Example 1 was incorporated into the phenol formaldehyde resin of Example 10, Part A to the extent of 10% to prepare a hard tough translucent resin that was not brittle.

EXAMPLE 14

The oxyethylene-oxypropylene epoxyhydrocarbon polymer of Example 9 was incorporated in the phenol formaldehyde resin of Example 10, Part A in the amounts of 10–70% in 10% increments. The resulting compositions were heat cured and had excellent plastic properties, whereas the unplasticized resin was opaque and brittle.

EXAMPLE 15
Part A

Into the apparatus of Example 10, Part A were charged 94 grams (1 mol) of phenol, 62.5 grams of 40% formalin (0.84 mols of formaldehyde) and 0.3 grams of concentrated sulfuric acid dissolved in 10 ml. of water. The reaction mixture was refluxed for one hour and neutralized with the calculated amount of calcium hydroxide dispersed in 5 ml. of water. The reaction mixture was dehydrated by distillation at a pressure of 100 mm. of mercury until a sample of the resin was brittle when removed from the reaction flask. The reaction mixture was poured into a shallow pan to solidify and thereafter was ground to a powder.

Part B

One hundred fifteen grams of the ground resin obtained in Part A was mixed with 9 grams of hexamethylene tetramine and 102 grams of wood flour filler. The resulting mixture was divided into three equal parts and the epoxyhydrocarbon polymer of Example 5 was incorporated therein in the amount of 10, 20 and 30% by weight. The three samples were molded in an electrically heated Carver Press at 165° C. under a pressure of 2500 p. s. i. for 20 minutes. The plasticized resin molded well and the plasticizer was completely compatible therewith, since there was no "sweating out" of the plasticizer. The discs so obtained were smooth, very hard and tough.

EXAMPLE 16
Part A

Ninety grams of a spirit soluble phenol formaldehyde resin and 10 grams of the epoxyhydrocarbon polymer of Example 7 were dissolved in 100 grams of ethylene glycol monomethyl ether. A control solution was prepared by dissolving 100 grams of the same spirit soluble phenol formaldehyde resin in 100 grams of ethylene glycol monomethyl ether. Steel plates measuring 2 x 4 x 0.05 inches were dipped into each of these two solutions and air dried for 10 minutes. A second and third dip were made at 10 min. intervals and the coated steel plates were then heated at 160° C. for 15 minutes to cure the resins. The plates were then cooled below 0° C. and bent double. The varnish coatings containing the epoxyhydrocarbon polymer plasticizer did not crack or blister, whereas the unplasticized control resin did.

Part B

Part A was repeated except that the oxyethylene-oxypropylene epoxyhydrocarbon polymer of Example 8 was employed as the plasticizer. Again the epoxyhydrocarbon polymer plasticized varnish coatings did not crack or blister, whereas the unplasticized control resin did.

EXAMPLE 17
Part A

A polystyrene resin was melted and 20% of the polyoxypropylene glycol of Example 1 was incorporated therein. The plasticized resin composition was cast into narrow rods which could be stretched and bent and had very high tensile strength. These properties were quite remarkable in that the unplasticized polystyrene was hard and brittle, and were quite unexpected in that few if any compounds are known to have a plasticizing action on polystyrene.

Part B

Under analogous conditions, comparable results were obtained when the epoxyhydrocarbon polymer of Example 3 was employed as the plasticizer in the same polystyrene resin.

EXAMPLE 18
Part A

Monomeric methyl methacrylate was partially polymerized to a syrup-like consistency on a steam bath. 40% of the conjugated polyoxyethylene-polyoxypropylene glycols of Examples 4 and 6 were incorporated into the partially polymerized methyl methacrylate and the resulting compositions were cast in thin rods and polymerized to the solid state. All of the compositions were transparent, flexible and rubber-like and could be tied in knots. In contrast to these results, the unplasticized polymethyl methacrylate was hard and brittle.

Part B

Similarly, 40% of the heteric polyoxyethylene-polyoxypropylene glycol of Example 2 was incorporated in the polymethyl methacrylate composition and a flexible rubber-like plastic composition was obtained.

Part C

Twenty percent of the conjugated polyoxyethylene-oxypropylene glycols of Examples 3 and 5 were incorporated into polymethyl methacrylate as described in Part A to obtain compositions having good plastic properties.

EXAMPLE 19
Part A

Into the apparatus of Example 10 of Part A were charged 108 grams (1 mol) of paracresol, 62.5 grams of 40% formalin (0.84 mols of formaldehyde) and 0.3 grams of concentrated sulfuric acid dissolved in 10 ml. of water. The reaction mixture was refluxed for one hour and neutralized with the calculated amount of calcium hydroxide dispersed in 5 ml. of water. The reaction mixture was dehydrated by distillation at a pressure of 100 mm. of mercury, to a maximum pot temperature of 130° C., until a sample of the resin was brittle when removed from the reaction flask.

Part B

Four parts of the resin of Part A was melted and 1 part of the conjugated polyoxyethylene-polyoxypropylene glycol of Example 3 was incorporated therein. The mixture of resin and plasticizer was cast into clear flexible rods and heat cured to obtain compositions having excellent plastic properties. Comparable results were obtained when the conjugated polyoxyethylene-polyoxypropylene glycol of Examples 4–6, inclusive, were incorporated into the cresol formaldehyde resin of Part A.

EXAMPLE 20
Part A

Ninety-four grams (1 mol) of phenol, 120 grams (1.25 mols) of furfural and 2 grams of NaOH in 10 ml. of water were placed in the apparatus described in Example 10, Part A. The reaction mixture was refluxed for 2.5 hours and then dehydrated by distillation at a pressure of 100 ml. of mercury until a sample of the resin was brittle at room temperature.

Part B

The conjugated polyoxyethylene-polyoxypropylene glycols of Examples 3-6, inclusive, were incorporated into the phenol furfural resin of Part A to the extent of 20% by weight to obtain resin compositions having excellent plastic properties.

EXAMPLE 21

The conjugated polyoxyethylene-polyoxypropylene glycols of Examples 3-6, inclusive were incorporated in a coumarone-indene resin melting at 127-137° C. to the extent of 20% by the method described in Example 19, Part B. Rods of the plasticized resin were flexible and had excellent plastic properties.

EXAMPLE 22

Twenty per cent by weight of each of the conjugated polyoxyethylene-polyoxypropylene glycols of Examples 3-6, inclusive, were incorporated into an ethoxyline resin by melting the resin and stirring the plasticizer therein. The ethoxyline resin was the condensation product of 4,4' dihydroxy-2,2-diphenylpropane and epichlorohydrin and had a melting point of 150° C. The mixtures of the ethoxyline resin and plasticizer were cast into thin rods and heat-cured to obtain flexible rods which had good plastic properties.

EXAMPLES 23-33

The plasticizing action of several different epoxyhydrocarbon polymers was determined upon several different thermoplastic and thermosetting resins as follows:

A 5% solution of resin is prepared in a volatile organic solvent and an amount of epoxyhydrocarbon polymer corresponding to 25% by weight of the resin is added thereto. The solution of resin and plasticizer is then film cast to prepare thin films of the plasticized resin.

Table II below includes data showing the resin that was plasticized, the epoxyhydrocarbon polymer used as the plasticizer and the solvent from which the film was cast:

Table II

| Example No. | Resin | Solvent | Epoxyhydrocarbon Polymer Plasticizer |
|---|---|---|---|
| 23 | Vinyl Chloride-Vinyl Acetate Copolymer (5% Vinyl Acetate). | Mesityl Oxide | Examples 3, 4 and 6. |
| 24 | Vinyl Chloride-Vinyl Acetate Copolymer (12% Vinyl Acetate). | do | Do. |
| 25 | Vinyl Choride | do | Examples 3, 4, 5 and 6. |
| 26 | Vinyl Acetate | do | Examples 3, 4 and 6. |
| 27 | Vinyl Choride-Vinylidene Choride (15% Vinylidene Choride). | do | Examples 3, 4, 5 and 6. |
| 28 | Ethyl Cellulose (48% Ethoxy). | do | Examples 3, 4 and 6. |
| 29 | Cellulose Acetate (40% acetylated). | Acetone | Examples 5 and 6. |
| 30 | Nitro Cellulose (12% nitrated). | Mesityl Oxide | Examples 3, 4, 5 and 6. |
| 31 | Cellulose Acetate Butyrate (13% Acetyl, 37% Butyral). | do | Do. |
| 32 | Urea Formaldehyde | do | Do. |
| 33 | Melamine Formaldehyde | Butanol | Do. |

All of the above prepared films were clear and transparent indicating compatibility of the resin and epoxyhydrocarbon polymer. All of the films were flexible and well plasticized.

EXAMPLE 34

One part cellulose acetate (40% acetylated) and 1.5 parts of the conjugated polyoxyethylene-polyoxypropylene glycol of Example 5 were incorporated in 19 parts of acetone, and this solution was cast into thin films. The plasticized film was flexible and resilient and, most remarkable, had a higher tensile strength than the unplasticized film. These results were most unexpected since in nearly all cases the beneficial effects of incorporating plasticizers in resins are associated with a concomitant decrease in the ultimate tensile strength of the resin.

EXAMPLE 35

Forty per cent of the conjugated polyoxyethylene-polyoxypropylene glycol of Example 5 was incorporated in a polyvinyl acetate resin and films thereof were cast as described in Example 26. In addition to its plasticizing action, this plasticizer increased the strength of the film and reduced the tackiness that is characteristic of polyvinyl acetate films. A similar effect was noted when this conjugated polyoxyethylene-polyoxypropylene glycol was incorporated in the polystyrene resin of Example 17, the ethoxyline resin of Example 22 and the coumarone-indene resin of Example 21.

In addition to the specific systems of resin and plasticizer set forth in the above examples, the epoxyhydrocarbon polymer plasticizers are compatible with and exert a plasticizing action on a large number of other resins including the alkyd resins, the polyester resins and the polyamide resins. It will also be recognized that the epoxyhydrocarbon polymer plasticizers may be used interchangeably in the resin systems set forth. Thus, the heteric polyoxyethylene-polyoxypropylene glycols of Example 2 as well as the alkyl ethers thereof and the polyoxypropylene glycol of Example 1 may be used in the systems illustrated in Examples 10, 11, 14, 16 and 19-35.

To have an efficient plasticizing action upon resins, it is essential that the epoxyhydrocarbon polymers employed in this invention contain in their structure at least 15% by weight of higher oxyalkylene groups containing three or more carbon atoms. For example, when a polyethylene glycol having a molecular weight of 1000 is incorporated in a phenol formaldehyde casting resin of the type described in Example 10, Part A, the resulting resin compositions are transparent and flexible but do not have the toughness and tensile strength that is characteristic of the compositions described in Example 10, Part B and Example 11. In addition, it is well known in the art that polyethylene glycols are water-soluble and, therefore, the epoxyhydrocarbon polymer must contain at least 15% of a higher oxyalkylene group containing at least 3 carbon atoms so that the plasticizer will not be extracted from the plasticized resin by water. The preferred epoxyhydrocarbon polymers employed in the plasticized resin compositions of this invention have molecular weights in excess of 250 and optimum results are obtained when the molecular weight is at least 500.

The quantity of epoxyhydrocarbon polymer that can be incorporated into the resin composition is a function of the type and molecular weight of the resin and the chemical structure and molecular weight of the epoxyhydrocarbon polymer. As is clearly set forth in the examples, the herein described epoxyhydrocarbon polymers are compatible with the vinyl resins, although the quantity of plasticizer that can be incorporated therein is a function of each particular vinyl resin. In particular, the plasticizers are compatible only to a limited extent in those resins having strong hydrogen bonding tendencies such as the vinylidene chloride and acrylonitrile polymers. Of particular importance is the fact that the epoxyhydrocarbon polymers are compatible with polystyrene and exert a strong plasticizing action thereon. Similarly, the epoxyhydrocarbon polymers are excellent plasticizers for cellulose esters and ethers, the alkyd resins, the polyester resins, the polyamide resins, the diene type addition polymers, and the thermosetting resins, particularly those prepared from formaldehyde. The remarkable plasticizing action of the epoxyhydrocarbon polymers on the thermosetting resins derived from formaldehyde is an outstanding feature of the present invention.

With any particular resin, the quantity of epoxyhydrocarbon polymer compatible therewith is a function of the relative quantity of oxyethylene and higher oxyalkylene groups contained therein and, of course, this relationship is dependent upon the particular resin in which the plasticizer is being incorporated. The incorporation of small quantities of the epoxyhydrocarbon polymers in the normally brittle resins, such as polystyrene and the phenol formaldehyde resins, results in a significant improvement in the shock resistance thereof with little or no depreciation of other desirable properties such as high tensile strength. Consequently, improved radio cabinets and other structural members can be made with the plasticized resin compositions of this invention. The incorporation of larger quantities of the plasticizers in the resins, even such thermosetting resins as the phenol formaldehyde type, gives products having excellent flexibility which can be cast into thin films.

A remarkable feature of the plasticized thermosetting resin compositions of the present invention is that, contrary to prior art teachings, they are compatible over a wide range of concentrations with conventional ester type plasticizers. For example, tricresyl phosphate, dibutyl phthalate and diphenyl phthalate are incompatible with the phenol formaldehyde casting resin of Example 10, Part A. However, a mixed plasticizer comprising 60% of either tricresyl phosphate or diphenyl phthalate and 40% of the conjugated polyoxyethylene-polyoxypropylene glycol of Example 4 is compatible with this same phenol formaldehyde resin to the extent of at least 30% by weight. Similarly, a mixed plasticizer comprising 30% dibutylphthalate and 70% of the conjugated polyoxyethylene-polyoxypropylene glycol of Example 4 is compatible with this phenol formaldehyde resin to the extent of at least 30%.

Although epoxyhydrocarbon polymers which contain in their structure at least 15% of an oxyalkylene group containing three or more carbon atoms, as a class, exert a plasticizing action on resin compositions, there are material differences between the various types of compounds falling within this generic classification. The epoxyhydrocarbon polymers coming within the present invention may be considered as constituting three principal classes of compounds which are:

1. Polyoxyalkylene glycols which are derived from a single 1,2 alkylene oxide which contains at least three carbon atoms. Examples of such compounds include the polyoxypropylene glycols, the polyoxybutylene glycols, the polyoxyamylene glycols, etc.

2. The "heteric" or mixed glycols which contain two or more different individual oxyalkylene groups which are randomly distributed throughout the chain. Examples of such heteric glycols include the polyoxyethylene-polyoxypropylene glycols that are prepared by condensing a mixture of ethylene and propylene oxides with either ethylene or propylene glycol or a mixture thereof.

3. Polyglycols, which although containing two different oxyalkylene groups in their structure, have them arranged in an orderly or conjugated structure. Examples of these compounds include the conjugated polyoxyethylene-polyoxypropylene glycols of the type described in the copending application of Lester G. Lundsted, 386,945, now U. S. 2,674,619, and which have the following type formula:

HO(C₂H₄O)x-polyoxypropylene polymer-(C₂H₄O)x′H wherein: the polyoxypropylene polymer has an average molecular weight of at least 250 and the weight of the radicals (C₂H₄O)x and (C₂H₄)x′ constitutes at least 20% of the total weight of the compound and monosubstituted derivatives of the conjugated polyoxyethylene-polyoxypropylene glycol of the type described in the copending application of Donald R. Jackson and Lester G. Lundsted, Serial No. 229,128 filed May 31, 1951 now Patent Number 2,677,700, which have the following type formula:

R—(C₃H₆O)x(C₂H₄O)yH wherein: R is the residue of an organic compound containing therein a single hydrogen atom capable of reacting with a 1,2 alkylene oxide, x is at least 3, and y has a value such that the weight of the (C₃H₆O) groups constitutes at least 15% by weight of the compound.

Although each of the above type epoxyhydrocarbon polymers has a plasticizing action upon both thermoplastic and thermosetting resins, each of the types is particularly efficacious in plasticizing certain specific resins. Of the three type plasticizers, optimum results are usually obtained with the conjugated polyoxyethylene-polyoxypropylene glycol type since these plasticizers have the greatest compatibility with the resins herein illustrated and exert the most powerful plasticizing action thereon.

The plasticized resin compositions of this invention may have incorporated therein curing agents, dyes and pigments, inert fillers, antioxidants, and other compounding agents which are well known in the art.

This application is a continuation-in-part of our copending application Serial No. 259,476, filed December 1, 1951, now abandoned.

What is claimed is:

1. A plasticized resin composition comprising polystyrene and, as the plasticizing ingredient, a polyoxypropylene glycol of 1800 molecular weight.

2. The composition of claim 3 in which the polyoxypropylene glycol has a molecular weight of at least 500.

3. A plasticized resin composition comprising polystyrene and, as the plasticizing ingredient, a polyoxypropylene glycol having a molecular weight of at least 250.

References Cited in the file of this patent

UNITED STATES PATENTS 2,595,952    Kunze et al. _____ May 6, 1952

FOREIGN PATENTS 349,638    Great Britain _____ June 4, 1931